United States Patent Office 3,466,642
Patented Sept. 9, 1969

3,466,642
METHOD AND DEVICE FOR AUTOMATIC LEAK-AGE DETECTION IN LIQUID-PRESSURE INSULATED POWER CABLES
Guy Terramorsi, Vincennes, France, assignor to Trefimetaux, Paris, France, a French company
Filed Mar. 20, 1967, Ser. No. 624,494
Claims priority, application France, Mar. 31, 1966, 55,812
Int. Cl. G08b 21/00
U.S. Cl. 340—242                                6 Claims

ABSTRACT OF THE DISCLOSURE

Leakage is automatically detected in a cable filled with an insulating liquid under pressure by monitoring pressure and temperature and comparing corresponding electric signals, and also by adding to the temperature signal a third electric signal which is adjusted so that in case of a leak, a minimum volume of liquid is lost before the alarm is given. Preferably, the third signal varies in accordance with the temperature of expansion reservoirs for the insulating liquid.

---

This invention relates to a method and device applicable to electric cables in which the cable sheath contains a liquid under pressure such as oil or like insulating material. The aim of this invention is to permit the automatic detection of leakages which are liable to arise with a view in particular to providing remedial action before damage is caused to the installation.

There are at present in existence two main types of supply systems for oil-pressure cables which serve on the one hand to maintain a given pressure and, on the other hand, to permit the expansion of the oil within a sealed enclosure as a function of the variations in temperature of the oil resulting from internal heating of the cable or from variations in the outside temperature. These two supply systems are respectively of the constant-pressure type and variable-pressure type.

In the first case, the pressure is maintained either under the action of gravity from a super elevated leak-tight elastic vessel which is subjected to atmospheric pressure and constitutes a gravity reservoir or by means of a pump set which supplies the cable from a reservoir which is usually maintained either a vacuum or a low pressure of inert gas. The supply system contains a useful volume corresponding to the expansion of the coil between the coldest state (cable on no-load in winter) and the hottest state (cable continuously on full load in summer) and a supplementary safety volume. In the event of leakage, a warning is usually given by an apparatus which measures either directly or indidectly the quantity of oil contained in the reservoir and indicates that the minimum level has been reached.

In the case of cables which are supplied at variable pressure, the expansion of oil can be absorbed either by the cable itself when it is provided with a flexible sheath or internal elastic vessels or more commonly by reservoirs in which the inflow of oil compresses leak-tight gas-filled elastic cells. The pressure which is transmitted to the oil therefore varies between two extreme values and a manometer gives an alarm when the bottom pressure limit is reached, thus indicating the occurrence of leakage.

However, alarm systems of this type are subject to certain disadvantages: when the cable is not in service during cold weather, the volume in the reservoirs or the pressure, depending on the case, are close to the minimum level. If leakage were to arise under these conditions, a warning will be given rapidly without any substantial loss of oil. On the other hand, in the most unfavorable case in which leakage were to occur on full load and in summer, a warning is given only when the entire useful volume is lost.

Aside from the substantial loss of oil, this entails a series of consequences which are detrimental to the cables and which are prejudicial to the user's interests. In fact, the user can in such a case depend only on a small safety volume and is obliged to take the installation out of service. This entails cooling of the cables and these latter absorb a quantity of oil which can attain three quarters of the useful volume. Inasmuch as the safety volume is rarely so high, the highest parts of the installation will not be covered with oil and will drain and thus be under reduced pressure, which is dangerous for the cables and entails long and costly repairs.

The object of the present invention is to overcome the different drawbacks referred to. The primary aim of the invention is to reduce to a minimum value the quantity of oil which is lost prior to the alarm so that, when the alarm has been given, the volume or the pressure remains sufficient to maintain the cable in service.

In the particular case of single-pole cables filled with fluid oil, which, when the phases are in the same thermal state, carry the same load and are supplied by separate and identical batteries, it is known to construct an alarm system by providing between the phases a device for the differential measurement either of volume or of pressure. It is thus possible to limit to a considerable extent the quantity of oil which is lost before the warning is given. However, this solution applies only to a single case, whereas the invention is applicable to all types of cables under pressure of oil or any other liquid. See for example U.S. Patent No. 2,092,560, Sept. 7, 1937.

In accordance with the invention, the method of automatic detection of leakage in oil-pressure insulated power cables is mainly characterized in that it consists in measuring one of the variable parameters of the oil (volume, pressure respectively, depending on whether the cables are of the constant-pressure type or of the variable-pressure type), in additionally measuring the temperature of an accessible point of the cable, in producing from this measurement by analog means a quantity which represents the values of the parameter (volume, pressure) which corresponds to the safety limit established in respect of the measured temperature, in comparing said quantity with another quantity corresponding to the measured value of the parameter (volume, pressure) under consideration and in initiating an alarm if this second quantity is smaller than the first.

One of the essential advantages of the invention is to indicate leakage rapidly, thus making it possible to reduce the quantity of oil lost to the lowest possible value within the accuracy of the measuring means employed.

In accordance with a preferred mode of execution of the invention, the alarm level is caused to vary linearly as a function of the measured temperature in the cable.

A study of the variations in volume of oil in the reservoirs as a function of the temperature of the metallic sheath of a fluid-oil cable or of the steel pipe of a cable shows in fact that it is possible with a very good approximation to express variation of the minimum volume as a linear function of temperature.

The method according to the invention can also be adapted so that the measurement of the parameter (volume, pressure) of the oil is transformed into an electric voltage and so as to produce by analog means another electric voltage representing the safety limit for the temperature thus measured, whereupon these two voltages are compared by an opposition method.

According to the invention, the device for the automatic detection of leakage in oil-pressure insulated power cables is mainly characterized in that it comprises at least one element for measuring the temperature of the cable at least at one accessible point thereof, a transducer which is coupled with the measuring element and means controlled by said transducer and adapted to deliver an electric signal representing the minimum volume of oil which should be present within the installation at the measured temperature, the device further comprising at least one element for measuring the volume of oil contained in the installation, said element being adapted to control a transducer which delivers an electric signal representing said volume, a comparison circuit which receives in parallel the two aforesaid electric signals, a bistable device controlled by the comparison circuit and an alarm system controlled by said bistable device.

A device of this type can be mounted on the existing cables or alternatively the cables can be specially adapted during manufacture for measurement of their internal temperature.

Further particular features of the invention will become apparent from the description which now follows below.

In the accompanying drawings, which are given by way of example and not in any limiting sense.

In the description which follows hereinafter in reference to the accompanying drawings, the method will be explained at the same time as the operation of the device.

Figure 1:
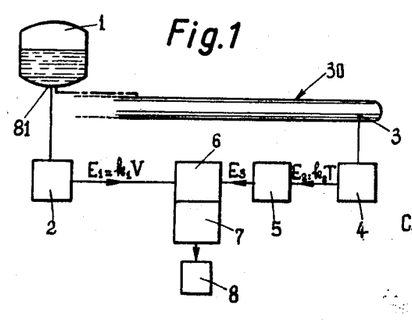
FIG. 1 is a diagrammatic view of a device in accordance with the invention.

Referring to FIG. 1, the reference numeral 1 designates the oil reservoir from which the cable 30 is supplied and which serves to maintain a substantially constant pressure within said cable.

Two transducers 2 and 4 are provided for the purpose of producing electric voltages $E_1$, $E_2$ which are respectively proportional to the volume V of oil within the reservoir 1 and at the temperature T of an accessible point 3 of the cable 30:

$$E_1 = k_1 V$$
$$E_2 = k_2 T$$

The transducer 2 is coupled for this purpose with a detector 81 such as a manometric probe placed within the reservoir 1, it being understood that many other known means could be employed for this purpose such as, for example, a system for weighing the reservoir.

The measurement of the temperature T of the cable 30 can be performed in many known ways. In particular, this measurement can be performed by placing against the sheath of the cable or tubular casing containing the oil, and at the point 3, a probe which is influenced by conduction. Said probe can be constituted either by a thermocouple or alternatively by a resistance having a temperature coefficient which is not zero. This mode of measurement permits the application of the invention to an existing cable without damaging this latter.

However, the accuracy of the method is correspondingly greater as the measured temperature is closer to the mean oil temperature. An improved method according to the invention thus consists in measuring the temperature at different points of the cable and in obtaining the mean value thereof.

It is also possible to measure the overall temperature of the cable by producing a variation in electric resistance either of the sheath containing the oil at least over a predetermined length of the cable or of the resistance of a pair of conductive wires placed inside the cable, for example between the phases of a three-phase fluid-oil cable or inside the steel tube of a power-cable link.

Another known means of measuring the overall temperature consists in constructing a liquid-expansion thermometer constituted by a sealed tube filled with liquid which extends from one end of the cable to the other and passes out of this latter at one end.

The transducer 4 is coupled to a stage 5 which delivers a constant but also adjustable voltage or reference voltage C which is added to the voltage $E_2$ so as to produce the voltage $E_3$:

$$E_3 = E_2 + C = k_2 T + C$$

The transducer 2 and the stage 5 are connected in parallel to a differential comparator 6 coupled with a bistable device 7 which controls an alarm circuit 8.

The coupling between the comparator 6 and the bistable device 7 is such that, if $E_1$ is greater than $E_3$, the bistable device 7 is in a stable state in which the circuit 8 is not actuated. If $E_1$ is smaller than $E_3$, the bistable device 7 is in another stable state in which the circuit 8 is actuated. If $E_1$ becomes equal to $E_3$, the stage 6 initiates the passage of the bistable device 7 from the first state to the second, thereby tripping the alarm.

The comparison circuit 6 can be constituted by an opposition assembly which supplies either a positive or negative voltage. The bistable device 7 can be constituted by a polarized-supply relay. It is also possible to group together the elements 6 and 7 by utilizing a relay having differential windings of the same type as those employed in telephone switching circuits.

Figure 2:
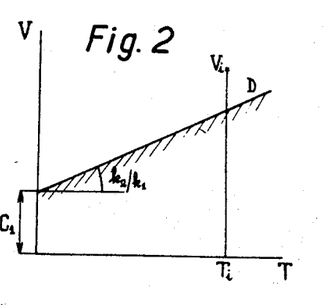
FIG. 2 is a graph of volume versus cable temperature that correlates the parameters of the invention.

The alarm threshold, which is the limit of passage from one state to the other, is thus defined by the following linear relation between the volume V and the temperature T:

$$k_1 V = k_2 T + C$$

or $$V = (k_2 / k_1) T + C_1$$

wherein $C_1$ designates another constant. The corresponding straight line D is shown in FIG. 2.

The values of the coefficients $k_1$, $k_2$ and C are established on the basis of an experimental study of permissible variations of the volume V as a function both of the temperature T and the ambient temperature so that, if the volume of oil within the reservoir 1 is sufficient, the point $V_1$ which is representative of the volume V at the temperature $T_1$ is placed above the straight line D and that, if said volume of oil is insufficient, said representative point is located below said straight line D, due allowance being made for a certain safety margin as necessitated by the relative precision of the measuring instruments in order to avoid accidental release of a warning signal.

The possibility of providing the alarm threshold by means of a function having a linear characteristic arises from the fact that the variation in minimum volume with the temperature actually differs very little from a linear law. A numerical example of this will be given hereunder.

Under these conditions, the device of FIG. 1 makes it possible to effect constant monitoring of the cable. As long as the volume V remains within permissible values, taking into account the continuously measured temperature T, then $E_1$ is greater than $E_3$ and the alarm circuit is not energized. The reduction in volume V below the permissible value produces a change of state of the bistable device 7 and trips the alarm.

The quantity of oil has in fact become insufficient for the temperature reached by the cable.

The value of the reference voltage C is determined in the first place by calculation, then a calibration can be carried out once the installation is assembled, in order to note the value of C and consequently to increase the sensitivity of detection.

In certain installations, it can be useful to obtain a higher degree of precision by correcting the alarm level as a function of a temperature other than that which is measured in the cable. This correction is necessary in practice, for example, in the case of variable-pressure systems for supplying fluid-oil cables from reservoirs with gas-inflated cells, the pressure of which is very sensitive to the gas temperature.

According to one of the characteristic features of the invention, it is precisely intended to carry out this correction by varying the reference voltage C and therefore the alarm level with the influential temperature, for example that of the gas contained in the cells. Since only a correction is being made, it is merely necessary for purposes of simplification to cause C to vary linearly with the temperature considered.

Figure 3:
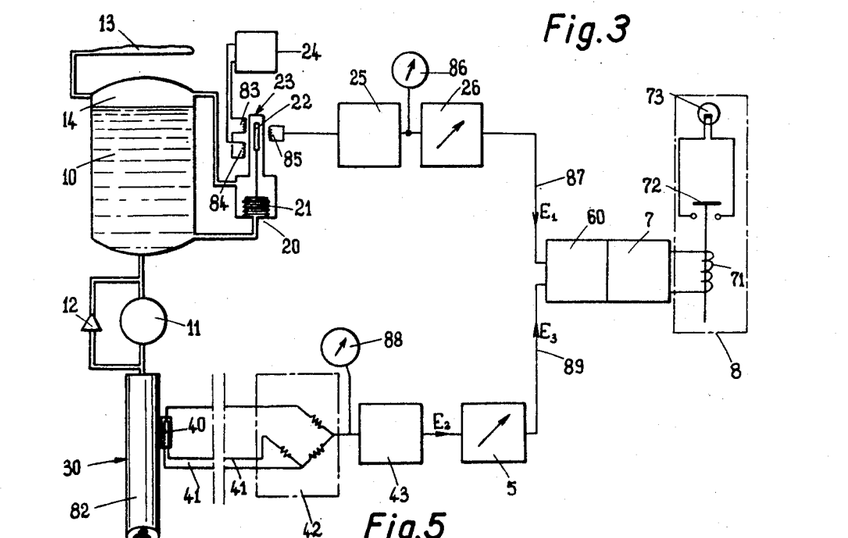
FIG. 3 is a more detailed view of a device for a cable which is supplied at constant pressure.

The device in accordance with FIG. 3 shows the application of the invention to a cable 30 which is supplied at constant pressure. The tube 82 of the cable is supplied from a reservoir 10 by a pump 11. A pressure regulator 12 maintains the pressure at the preselected value. An elastic bottle 13 maintains at the summit 14 of the reservoir 10 a nitrogen pressure which is slightly higher than atmospheric pressure.

The detector 20 which serves to detect the pressure difference existing between the top and the bottom of the reservoir 10 is connected between the top and the bottom of said reservoir. Its capsule 21 which is responsive to the pressure difference and therefore to the volume V of oil contained in the reservoir drives a magnetic core 22 of a differential transformer 23, the two primary windings 83, 84 of which are supplied from a stabilized source 24 and the secondary winding 85 of which is connected to a rectifier stage 25, at the output of which is connected a voltmeter 86 which is graduated in volumes, the rectifier 25 being adapted to deliver a voltage which is proportional to the volume V.

The stage 25 is coupled to a variable-gain amplifier 26 which delivers the voltage $E_1 = K_1 V$ to the conductor 87. The possibility of adjustment of gain of the amplifier 26 permits of variation of the coefficient of proportionality $K_1$.

The temperature of the cable 30 is measured by a probe 40, the resistance of which is proportional to the temperature T, and which is incorporated by virtue of a conventional 3-wire circuit 41 in a measuring bridge 42 at the output of which is connected a voltmeter 88 which is graduated in temperatures.

The output of the bridge 42 is directed to an amplifier 43 which delivers the voltage $E_2 = k_2 T$. The amplifier 43 is connected to an adjustable stabilized voltage source 5 which makes it possible to add a voltage C and thus to deliver to the conductor 89 a voltage $E_3 = k_2 T + C$.

The conductors 87 and 89 supply in parallel an amplifier 60 which constitutes the comparator 6 of FIG. 1. The amplifier 60 controls as before an electronic bistable device 7. The alarm circuit 8 is in this case constituted by a relay 71, the contact 72 of which controls the supply of current to a signal lamp 73 or like warning device.

The complete alarm system can be transistorized and thus takes up only a very small volume while requiring only a very small consumption of power.

There will now be described in reference to FIG. 4 a numerical example which will give a better illustration of the technical improvement provided by the invention.

A 225 kv. power-cable connection constituted by three cables of 800 mm.² placed in a steel pipe having an internal diameter of 180 mm. is capable of conveying 770 amps under continuous conditions over a distance of 10 kilometers. Between the coldest state and the hottest state, the variation in oil volume of 8,900 liters is absorbed by a reservoir containing 10,500 liters with a reserve of 1,000 liters below the minimum and 600 liters above the maximum.

Figure 4:
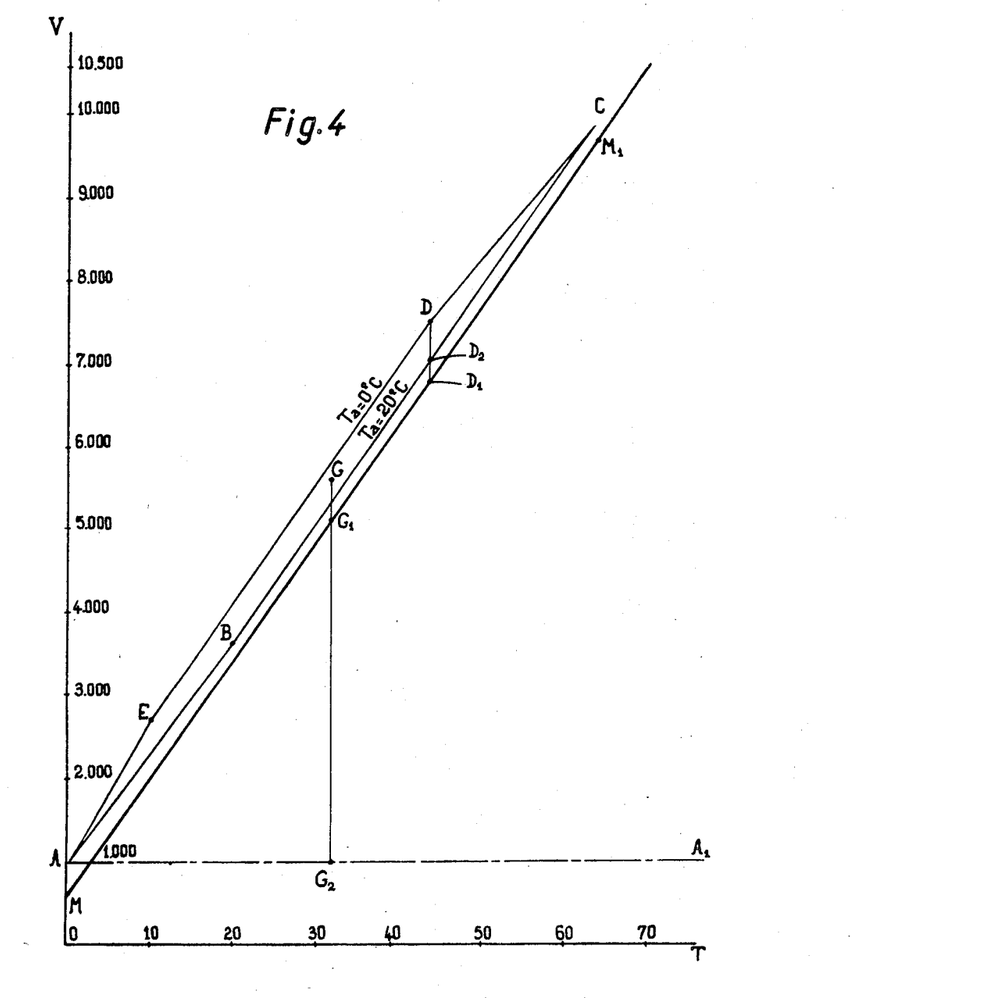
FIG. 4 is a graph similar to that of FIG. 2 but for a particular example.

In FIG. 4, there have been shown the extreme variations of the volume V according to the ambient conditions in the ground (temperature $T_a$) as a function of the temperature T of the pipe. The line BC (ground at 20° C.) indicates the minimum volume in the case of different temperatures of the pipe. The line ED (ground at 0° C.) shows the maximum volume. The point G corresponds to the means volume. The horizontal line $AA_1$ corresponds to the constant alarm level of conventional methods whilst the straight line $MM_1$ is the variable alarm level according to the equation $K_1 V = K_2 T + C$ as obtained with the invention.

The ordinate which is comprised between these two straight lines corresponds to the economy of oil which is permitted by the invention.

In fact, it is apparent that, on the average, a warning is given in the case of a variation in volume of $GG_1$, namely 450 liters whereas, in the case of systems of the prior art, the variation (corresponding to leakage) was equal to $GG_2$, namely 4,600 liters. The economy achieved is therefore 4,150 liters.

Under the most unfavorable conditions, the invention reduces the maximum oil loss from 8,900 liters (point C) to 750 liters (distance $DD_1$). If the temperature of the ground is 20° C. instead of 0° C., the oil loss is reduced to the quantity which is measured by the segment $D_1 D_2$.

It is thus apparent that oil economy can be improved by utilizing one of the improvements hereinabove indicated so far as concerns the measurement of temperature and the adjustment of the coefficient C as a function of the ambient temperature.

There will now be described in reference to FIGS. 5 to 7 the application of the invention to the case of a cable which is supplied at variable pressure.

The reservoir 10 referred to above and its pump set are replaced in this case by pressure reservoirs 50 which are mounted in parallel and contain cells 51 inflated with gas (for simplicity, only one set of cells 51 is shown). The differential pressure detector 20 measures in this case the relative pressure between the oil and the atmosphere.

The detection device differs from that of FIG. 3 only in the system of control of the regulation of the voltage source 5 in dependence on the temperature $T_r$ of the oil. To this end, provision is made in at least one of the reservoirs 50 for a resistance probe 52 which occupies one of the arms of a measuring bridge 53, the unbalance voltage of which is directed by the conductor 54 into the reference voltage source 5 which comprises a regulating device controlled in dependence on said voltage. For this purpose, the source 5 is constituted, for example, by an automatic potentiometer.

Under these conditions, the reference voltage C varies proportionately to the temperature $T_r$ of the oil within the reservoirs 50, thereby displacing the alarm level in translation towards the increasing ordinates progressively as $T_r$ increases.

By way of numerical example, consideration will be given to the case of a three-phase 63 kv. fluid-oil-insulated power cable having a cross-sectional area of 155 square millimeters, a length of 3,000 meters, and supplied from a bank of twelve parallel pressure-tanks. The apparent air volume of the cells of the bank at 15° C. and at atmospheric pressure is 1,560 liters. The temperature in the vicinity of the tanks can vary between −15° C. and +40° C. and the pressure of the bank can vary between 0.5 and 2 bars.

Figure 6:
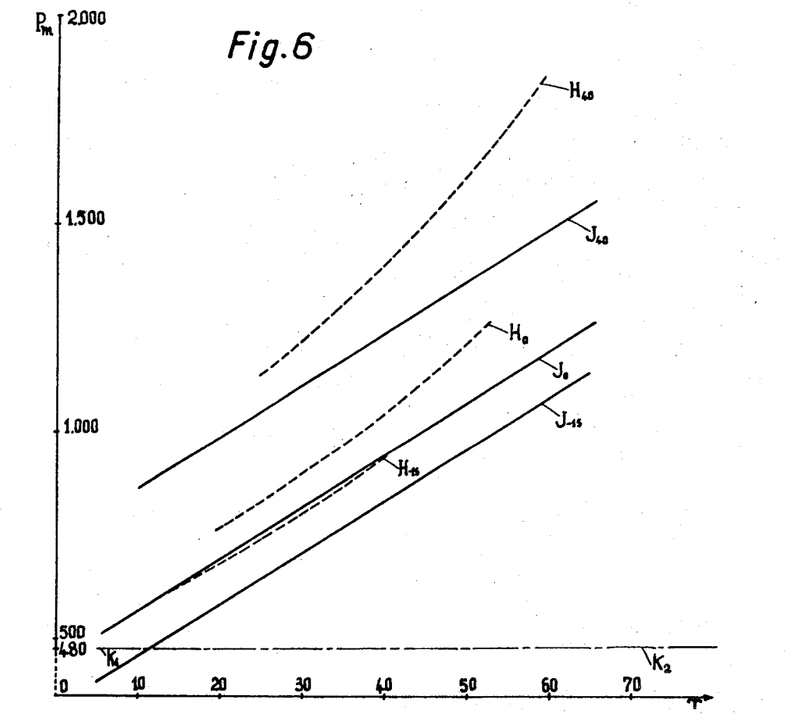
FIG. 6 is a graph of pressure versus cable temperature with respect to certain variable alarm levels.

The curves H–15, $H_0$, $H_{40}$ of FIG. 6 represent the variations in minimum pressure $P_m$ in millibars as a function of the temperature T of the lead sheath of the cable in respect of three values of the temperature $T_r$ of the tanks (−15°, 0°, +40° C.).

The straight lines J–15, $J_0$, $J_{40}$ are the variable alarm levels corresponding to each of the curves referred to whilst the horizontal line $K_1K_2$ corresponds to the constant alarm level which is fixed by conventional methods.

The value of the pressure which corresponds to the alarm trip in systems of the usual type is 0.480 bar as represented by the straight line $K_1K_2$. The difference between the ordinates of this latter and the straight lines J–15, $J_0$, $J_{40}$ in respect of a given temperature represents the gain in respect of pressure which is achieved by the invention.

Figure 7:
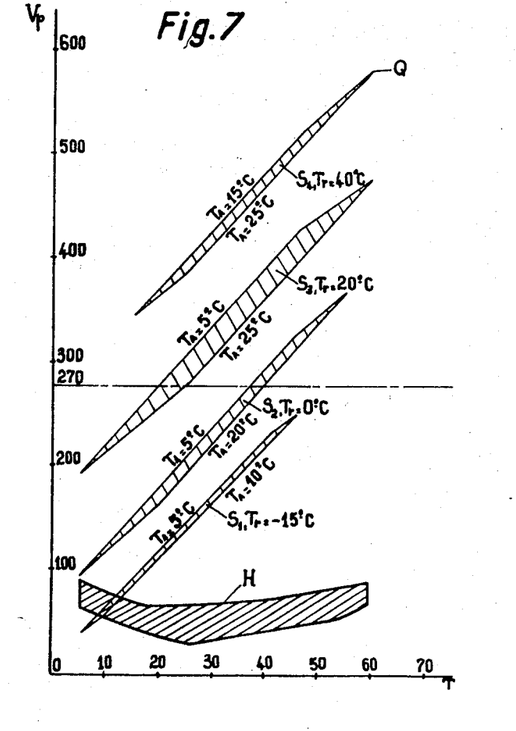
FIG. 7 is a graph of pressure versus cable temperature with respect to various reservoir temperatures and ground temperatures.

The diagram of FIG. 7 shows according to the ranges $S_1$, $S_2$, $S_3$, $S_4$ in the case of a conventional installation the volume $V_p$ of oil lost as a function of the temperature T of the cable sheath in respect of different values $T_r$ of the reservoir temperature and in respect of a predetermined temperature $T_r$ as a function of the ambient temperature $T_a$ (temperature of the ground in which the cable is located). The mean loss is established at 270 liters and, under the most unfavorable circumstances, at 552 liters (point Q).

Figure 5:
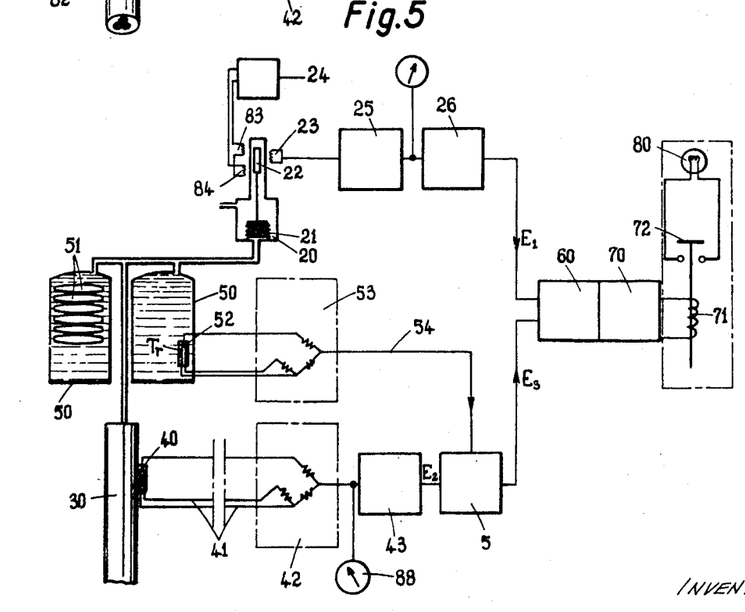
FIG. 5 is a diagram of an alarm system for a variable-pressure cable.

There is additionally shown at H the envelope of the curves of volume of oil lost in the case of an alarm produced in accordance with the arrangement of FIG. 5 (or in accordance with the curves of FIG. 6).

On an average, the device in accordance with the invention limits the loss of oil to 50 liters instead of 270 liters. Under the most unfavorable conditions, the loss is only 90 liters instead of 552 liters. Moreover, in conventional installations, when the contact manometer gives the alarm, the pressure has fallen to 0.48 bar whereas, by virtue of the invention, the residual pressure is in the majority of cases sufficient to permit the cables to be kept in service until repairs are undertaken.

Figure 8:
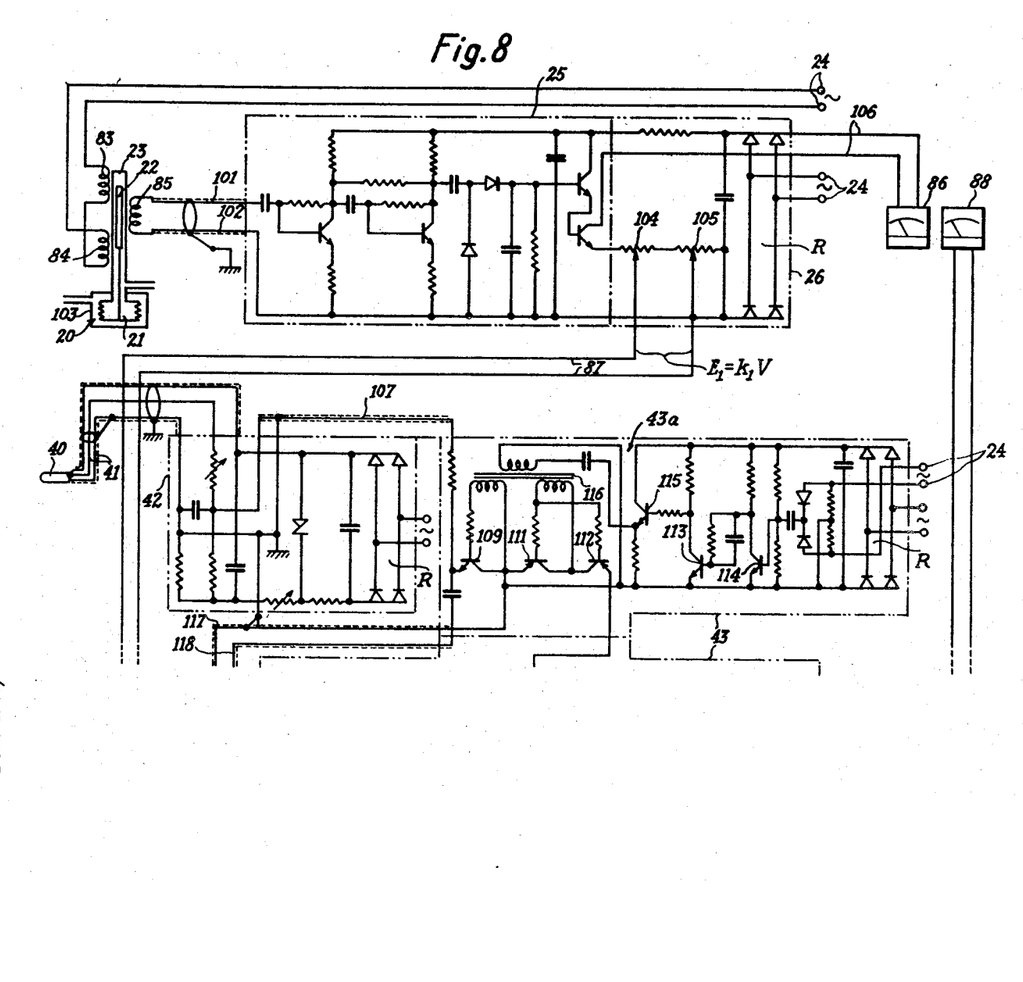
FIGS. 8 and 9 are detailed diagrams of an embodiment in accordance with FIG. 3.
Figure 9:
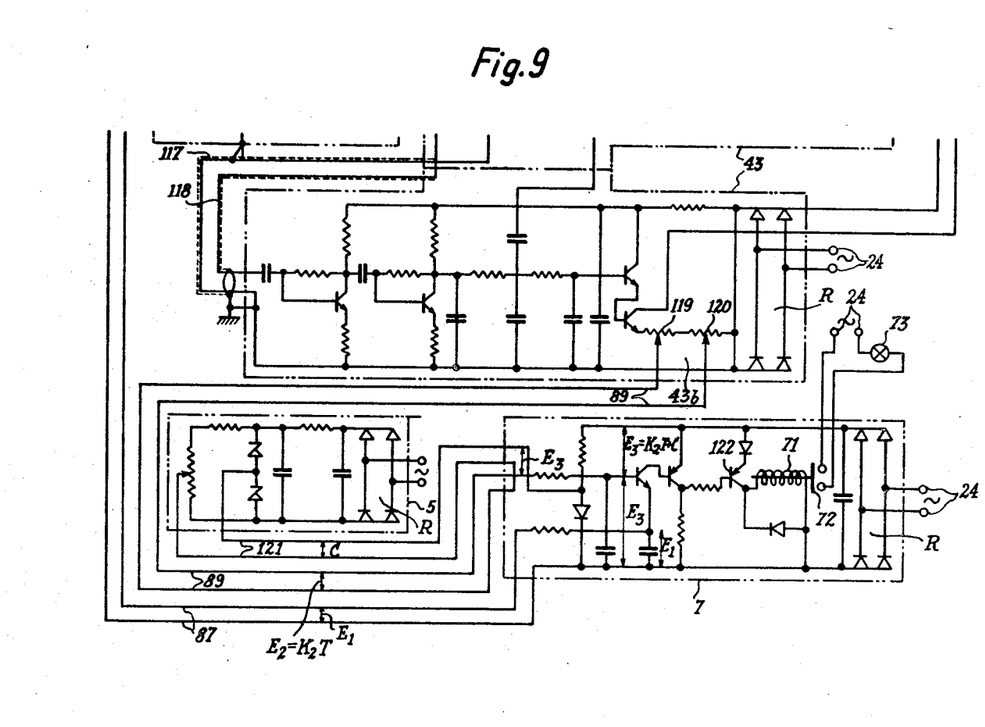

There has been shown in FIGS. 8 and 9 a particular form of execution with transistorized circuits of the system contemplated in FIG. 3. In those figures, the same elements or stages are provided with the same reference numerals as in FIG. 3.

The stages 25 and 26 are mounted on a plug-in printed card, the stage 42 is mounted on a second card, stage 43 on two cards and stages 5 and 7 each on one card. Each card is supplied with alternating current voltage from the stabilized alternating current source 24 and has its own rectifier circuit R, thereby dispensing with the need for a plurality of stabilized direct current supplies.

The detector 20 is constituted by a differential manometer which delivers across the terminals 101, 102 of the stage 25 a voltage which is propotrional to the pressure difference between the capsule 21 and the chamber 103 which contains said capsule.

The stage 25 which is associated with stage 26 constitutes an adjustable-gain demodulator amplifier by virtue of two potentiometers 104, 105 which deliver to the conductors 87 the voltage $E_1=k_1V$ and to the conductors 106 the measuring voltage V which is indicated by the voltmeter 86. The potentiometers 104, 105 serve to regulate $k_1$.

The temperature probe 40 is a platinum resistance which has, for example, a rated value of 100 ohms at 0° C. The probe 40 is coupled via the measuring bridge 42 to the stage 43, the first card 43a of which carries a modulator and demodulator chopper. This latter replaces a direct-current amplifier which would be subject to substantial drift. The low direct-current voltage delivered by the bridge 42 is applied by means of the conductor 107 and modulated by the transistor 109. The resultant square-wave voltage is amplified in alternating current then detected by the transistors 111, 112 (symmetrical chopper).

The chopper is energized by alternating current at 100 c./s. by the flip-flops 113, 114 and by the amplifier (transistor 115) which is coupled to the transformer 116.

The card 43b performs the function of voltage amplifier and current injector inasmuch as said card is coupled with the card 43a by means of the conductors 117, 118.

The adjustment of the coefficient $k_2$ is effected by the double potentiometer 119, 120.

As in the previous example, stage 5 is an adjustable auxiliary source of, for example, ±5 v.

In this circuit arrangement, the conductors 87, 89 and the output conductors 121 of stage 5 are directly connected to a bistable device 7 having two differential inputs followed by a power amplifier transistor 122 which drives the winding of the relay 71.

This circuit detects the sign of the difference $$k_1V-(k_2T+C)$$

If this difference is positive, the relay 71 is not energized. Should the contrary arise, the relay trips.

This arrangement shows that the means provided by the invention can permit the construction of an automatic detection system which controls the signal lamp 73 and which can be of very small overall size.

It is apparent that the invention is not limited to the particular embodiments described and that any alternative forms of execution may be contemplated.

Thus, in the event of a drop in pressure to the alarm value, the alarm circuit could comprise a device which is intended, for example, to reduce the leakage flow rate automatically by reducing the supply pressure.

It goes without saying that in the instant specification and claims the word "oil" means any liquid well suited for filling electric cables of the kind contemplated.

I claim:

1. In a method of automatic detection of leakage in a cable filled with an insulating liquid under pressure, said liquid expanding in expansion reservoirs, said method comprising measuring a pressure differential representative of the volume of liquid in the cable and converting said pressure differential into a first electric signal, measuring the temperature of at least a portion of said cable and converting said temperature into a second electric signal, and comparing said first and second electric signals to initiate an alarm whenever said first signal is smaller than said second signal by a predetermined amount; the improvement comprising adding to said second signal a third electric signal which is adjusted so that, in case of a leak, a minimum volume of liquid is lost before alarm is given, whatever the climatic and load conditions of the cable.

2. A method as claimed in claim 1 wherein said third electric signal is made to vary in accordance with the temperature of said expansion reservoirs.

3. In a device for the automatic detection of leakage in a cable filled with an insulating liquid under pressure, said liquid expanding in expansion reservoirs which are in communication with the inside volume of said cable, said device comprising a manometer to measure a pressure differential representative of the volume of liquid in said cable, a thermometer to measure the temperature of at least a part of said cable, transducers to convert these two measurements into electrical signals, and a comparison circuit to compare both signals and initiate an alarm whenever the pressure-representing signal is smaller than the temperature-representing signal by a predetermined amount; the improvement comprising a regulated and adjustable source of electrical signal, the output of which is connected in series with one of the two said measurement electric signals, and means to control said adjustable source of signal to adjust the alarm triggering level so that a minimum quantity of liquid is lost in case of leakage, before an alarm is given, whatever the climatic and load conditions of the cable.

4. A device as claimed in claim 3, wherein said control means for said adjustable signal comprises a thermometer to measure the temperature of the expansion reservoirs and convert said temperature into an electrical signal which controls said adjustable source of signal thereby to vary the alarm triggering level in accordance with said reservoirs temperature.

5. A device as claimed in claim 3, wherein said transducers are linear and give output electrical signals which are a linear function of their input.

6. A device as claimed in claim 3, wherein said transducers comprise an adjustable gain amplifier to adjust the slope of the volume of liquid versus temperature relationship which determines the level of alarm triggering.

References Cited

UNITED STATES PATENTS

| 2,040,285 | 5/1936 | Tietz et al. | 73—40.5 |
| 2,092,560 | 9/1937 | Runaldue. | |
| 2,244,392 | 6/1941 | Emanueli. | |
| 2,924,965 | 2/1960 | Westerheim | 73—40 |
| 3,012,432 | 12/1961 | Moore et al. | 73—40 |
| 3,046,369 | 7/1962 | Hicks | 73—49.3 XR |

LOUIS R. PRINCE, Primary Examiner

JEFFREY NOLTON, Assistant Examiner

U.S. Cl. X.R.

73—40.5, 147